(12) United States Patent
Usui et al.

(10) Patent No.: US 11,667,783 B2
(45) Date of Patent: Jun. 6, 2023

(54) RESIN COMPOSITION, MELT-FORMING MATERIAL, MULTILAYER STRUCTURE, AND AGRICULTURAL FILM

(71) Applicant: MITSUBISHI CHEMICAL CORPORATION, Tokyo (JP)

(72) Inventors: Shintaro Usui, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 13 days.

(21) Appl. No.: 17/552,667

(22) Filed: Dec. 16, 2021

(65) Prior Publication Data

US 2022/0106476 A1 Apr. 7, 2022

Related U.S. Application Data

(60) Division of application No. 16/838,557, filed on Apr. 2, 2020, now Pat. No. 11,230,639, which is a continuation of application No. PCT/JP2018/043114, filed on Nov. 22, 2018.

(30) Foreign Application Priority Data

Nov. 22, 2017 (JP) .............................. JP2017-224609

(51) Int. Cl.
*C08L 29/04* (2006.01)
*A01G 13/02* (2006.01)

(52) U.S. Cl.
CPC .......... *C08L 29/04* (2013.01); *A01G 13/0275* (2013.01)

(58) Field of Classification Search
CPC .............................. C08L 29/04; A01G 13/0275
USPC ........................................................ 524/315
See application file for complete search history.

(56) References Cited

U.S. PATENT DOCUMENTS

| | | | |
|---|---|---|---|
| 5,744,547 A | 4/1998 | Moritani et al. | |
| 2010/0255330 A1 | 10/2010 | Ninomiya et al. | |
| 2013/0040157 A1 | 2/2013 | Igarashi et al. | |
| 2015/0152256 A1 | 6/2015 | Nakazawa et al. | |
| 2016/0243746 A1 | 8/2016 | Kawai | |
| 2016/0251500 A1 | 9/2016 | Kawai | |
| 2017/0183426 A1 | 6/2017 | Kawai et al. | |
| 2018/0319965 A1 | 11/2018 | Seno et al. | |

FOREIGN PATENT DOCUMENTS

| | | |
|---|---|---|
| CN | 104350103 A | 2/2015 |
| CN | 105579350 A | 5/2016 |
| CN | 106795232 A | 5/2017 |
| EP | 2 286 658 A2 | 2/2011 |
| EP | 2 286 658 B1 | 8/2012 |
| EP | 2554590 A1 | 2/2013 |
| JP | 09-071620 A | 3/1997 |
| JP | 2000-312538 A | 11/2000 |
| JP | 2002-234971 A | 8/2002 |
| JP | 2009-097010 A | 5/2009 |
| JP | 2011-046929 A | 3/2011 |
| JP | 2012-153861 A | 8/2012 |
| JP | 2012-193327 A | 10/2012 |
| WO | 2015/050221 A | 4/2015 |
| WO | 2015-050222 A1 | 4/2015 |
| WO | 2017/082063 A | 5/2017 |

OTHER PUBLICATIONS

Office Action issued in CN Patent Application No. 201880064788.9, dated Dec. 31, 2021, translation.
Office Action issued in TW Patent Application No. 107141661, dated Feb. 25, 2022, translation.
ISR issued WIPO Patent Application No. PCT/JP2017/019451, dated Aug. 15, 2017, translation.
IPRP issued WIPO Patent Application No. PCT/JP2017/019451, dated Nov. 27, 2018, translation.
ISR issued WIPO Patent Application No. PCT/JP2018/043114, dated Feb. 26, 2019, translation.
IPRP issued WIPO Patent Application No. PCT/JP2018/043114, dated May 26, 2020, translation.
SESR issued EP Patent Application No. 18881370.3, dated Nov. 11, 2020, translation.
Office Action issued in CN Patent Application No. 201880064788.9, dated Aug. 11, 2022, translation.
Office Action issued in TW Patent Application No. 107141661, dated Aug. 1, 2022, translation.
Office Action issued in CN Patent Application No. 201880064788.9, dated Dec. 5, 2022, translation.

*Primary Examiner* — Hui H Chin
(74) *Attorney, Agent, or Firm* — Greenblum & Bernstein P.L.C.

(57) ABSTRACT

A resin composition contains: (A) an ethylene-vinyl alcohol copolymer having an ethylene structural unit content of 20 to 60 mol %; (B) a saponified ethylene-vinyl acetate copolymer having an ethylene structural unit content of not less than 70 mol %; and (C) a sorbic acid ester; wherein the sorbic acid ester (C) is present in an amount of 0.00001 to 10 ppm based on the weight of the resin composition. The resin composition is resistant to coloration.

5 Claims, No Drawings

RESIN COMPOSITION, MELT-FORMING MATERIAL, MULTILAYER STRUCTURE, AND AGRICULTURAL FILM

RELATED APPLICATION

This a divisional application of U.S. patent application Ser. No. 16/838,557, filed on Apr. 2, 2020, which is a continuation of International Application No. PCT/JP2018/043114, filed on Nov. 22, 2018, which claims priority to Japanese Patent Application No. 2017-224609, filed on Nov. 22, 2017, the entire contents of each of which being hereby incorporated by reference.

TECHNICAL FIELD

The present disclosure relates to a resin composition containing an ethylene-vinyl alcohol copolymer (hereinafter referred to as "EVOH"), a melt-forming material produced by using the resin composition, a multilayer structure, and an agricultural film. More specifically, the present disclosure relates to a resin composition excellent in coloration-suppressing effect, a melt-forming material formed from the resin composition, a multilayer structure including a layer formed from the resin composition, and an agricultural film.

BACKGROUND ART

EVOH is excellent in transparency, gas barrier properties such as oxygen barrier property, aroma-retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials. However, EVOH is disadvantageously poor in impact resistance, flexural fatigue resistance, stretchability, thermoformability, heat sealability, and gas barrier properties in a moisture or water absorbed state.

A known approach to this disadvantage is to use a saponified ethylene-vinyl acetate copolymer having an ethylene structural unit content (hereinafter referred to as "ethylene content") of not less than 70 mol % as an EVOH property-improving agent.

The saponified ethylene-vinyl acetate copolymer having an ethylene content of not less than 70 mol % (hereinafter referred to as "higher ethylene content EVOH") is a thermoplastic resin mainly containing an ethylene structural unit and further containing a hydroxyl group. The higher ethylene content EVOH is similar in structure to ordinary EVOH, but has a higher ethylene content than ordinary EVOH. Thus, the higher ethylene-content EVOH has different properties from ordinary EVOH and, therefore, is generally regarded as a resin different from ordinary EVOH.

PTL 1, for example, discloses a soil-covering film imparted with excellent toughness by blending higher ethylene content EVOH and ordinary EVOH in a specific blend ratio. PTL 2 discloses a silage film imparted with thrust strength and tensile elongation without deterioration in gas barrier property by blending higher ethylene content EVOH and ordinary EVOH in a specific blend ratio. Further, PTL 3 discloses that higher ethylene content EVOH is used as a resin composition material to be added to a pulverized product for recycling a recycle material containing ordinary EVOH.

RELATED ART DOCUMENT

Patent Document

PTL 1: JP-A-2000-312538
PTL 2: JP-A-2011-46929
PTL 3: JP-A-2002-234971

SUMMARY

The resin compositions each containing the higher ethylene content EVOH as disclosed in PTL 1 to PTL 3 are liable to be thermally deteriorated and colored after heating in melt kneading and melt forming. Therefore, improvement is required.

The inventors conducted intensive studies in view of the foregoing and, as a result, found that, where the resin composition containing the ordinary EVOH and the higher ethylene content EVOH further contains a specific very small amount of a sorbic acid ester, the above problem can be solved.

According to a first aspect of the present disclosure, there is provided a resin composition containing: (A) an EVOH having an ethylene content of 20 to 60 mol % (hereinafter referred to as "EVOH (A)"); (B) a higher ethylene content EVOH; and (C) a sorbic acid ester; wherein the sorbic acid ester (C) is present in an amount of 0.00001 to 10 ppm based on the weight of the resin composition. According to a second aspect of the present disclosure, a melt-forming material formed from the resin composition is provided. According to a third aspect of the present disclosure, a multilayer structure including a layer formed from the resin composition is provided. According to a fourth aspect of the present disclosure, an agricultural film formed from the multilayer structure is provided.

The resin composition of the present disclosure contains the EVOH (A), the higher ethylene content EVOH (B), and the sorbic acid ester (C). In the resin composition, the sorbic acid ester (C) is present in an amount of 0.00001 to 10 ppm based on the weight of the resin composition. Thus, the resin composition containing the EVOH (A) and the higher ethylene content EVOH (B) is excellent in coloration-suppressing effect for suppressing heat coloration during melt kneading and melt forming.

Where the weight ratio of the EVOH (A) to the higher ethylene content EVOH (B) is (A)/(B)=1/99 to 99/1, the coloration-suppressing effect is further improved.

The melt-forming material formed from the resin composition of the present disclosure is less susceptible to the heat coloration and, therefore, is formed into various products, which can be advantageously used as packaging materials, for example, for foods, chemical agents, agricultural chemicals, and the like, and as agricultural film materials for silage films, soil-covering films, and the like.

The multilayer structure including the layer formed from the resin composition of the present disclosure is highly tough and less susceptible to heat coloration and, therefore, is formed into various products, which can be advantageously used as packaging materials, for example, for foods, chemical agents, agricultural chemicals, and the like, and as agricultural films such as silage films and soil-covering films.

DESCRIPTION OF EMBODIMENTS

Preferred embodiments of the present disclosure will hereinafter be described in detail. It should be understood that these preferred embodiments are illustrative but not limitative.

<Resin Composition>

The resin composition of the present disclosure contains: (A) an EVOH; (B) a higher ethylene content EVOH; and (C) a sorbic acid ester. The components of the resin composition of the present disclosure will hereinafter be described in turn.

[EVOH (A)]

The EVOH (A) to be used in the present disclosure is a water-insoluble thermoplastic resin that is typically prepared by copolymerizing ethylene and a vinyl ester monomer and then saponifying the resulting copolymer, and is generally referred to as ethylene-vinyl alcohol copolymer or saponified ethylene-vinyl ester copolymer. A known polymerization method such as solution polymerization method, suspension polymerization method or emulsion polymerization method may be utilized for the polymerization. In general, a solution polymerization method using methanol as a solvent is utilized. The saponification of the resulting ethylene-vinyl ester copolymer may be achieved by a known method.

The EVOH (A) to be used in the present disclosure mainly contains an ethylene structural unit and a vinyl alcohol structural unit, and generally further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have a carbon number of 3 to 20, more preferably 4 to 10, particularly preferably 4 to 7. These vinyl esters are typically each used alone or, as required, a plurality of vinyl esters may be selected from these vinyl esters to be used in combination.

The ethylene content of the EVOH (A), which is measured in conformity with ISO14663, is typically 20 to 60 mol %, preferably 25 to 50 mol %, particularly preferably 25 to 45 mol %. If the ethylene content is excessively low, the high-humidity gas barrier property of the thermoplastic resin and the melt formability of the thermoplastic resin tend to be deteriorated. If the ethylene content is excessively high, on the other hand, the gas barrier property tends to be deteriorated.

The vinyl ester saponification degree of the EVOH (A), which is measured in conformity with JIS K6726 (with the use of a solution obtained by homogeneously dissolving the EVOH in a water/methanol solvent), is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The EVOH (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH (A) is excessively high, the film formability tends to be deteriorated. If the MFR of the EVOH (A) is excessively low, the melt extrusion tends to be difficult.

The EVOH (A) to be used in the present disclosure may further contain a structural unit derived from any of the following exemplary comonomers in an amount that does not impair the effects of the present disclosure (e.g., typically in an amount of not greater than 20 mol %, preferably not greater than 10 mol %, of the EVOH (A)).

The comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and derivatives including esterification products (acylation products) of these hydroxyl-containing α-olefins such as 3,4-diacyloxy-1-butene, 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxymethyl vinylidenes such as 1,3-hydroxy-2-methylenepropane and 1,5-hydroxy-3-methylenepentane, and esterification products of these hydroxymethyl vinylidenes (i.e., vinylidene diacetates) such as 1,3-diacetoxy-2-methylenepropane, 1,3-dipropionyloxy-2-methylenepropane, and 1,3-dibutyronyloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1 to C18 alkyl group; acrylamide compounds such as acrylamide, N-alkylacrylamides each including a C1 to C18 alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1 to C18 alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1 to C18 alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl (3-acrylamido-3-dimethylpropyl) ammonium chloride and acrylamido-2-methylpropane sulfonic acid. These may be used alone or in combination.

An EVOH containing a structural unit having a primary hydroxyl group in its side chain among structural units derived from the aforementioned comonomers is preferred because the secondary formability is improved in stretching process, vacuum pressure forming process, and the like. Particularly, an EVOH containing a structural unit having 1,2-diol in its side chain is preferred.

Where the EVOH (A) contains the structural unit having the primary hydroxyl group in its side chain, the primary hydroxyl group content is typically 0.1 to 20 mol %, preferably 0.1 to 15 mol %, particularly preferably 0.1 to 10 mol %.

The EVOH (A) may be a mixture of different EVOHs. These EVOHs may have different contents of the ethylene structural unit, different contents of the structural unit having the primary hydroxyl group in the side chain, different saponification degrees, and different melt flow rates (MFRs), and contain different comonomer components.

In the present disclosure, post-modified EVOHs such as urethanized EVOH, acetalized EVOH, cyanoethylated EVOH, and oxyalkylenated EVOH are also usable as the EVOH (A).

In the resin composition of the present disclosure, the EVOH (A) is typically present in a proportion of not less than 1 wt. %, preferably not less than 50 wt. %, more preferably not less than 60 wt. %, still more preferably not less than 70 wt. %. The upper limit of the proportion of the EVOH (A) is typically 99 wt. %. Where the proportion of the EVOH (A) falls within the aforementioned ranges, the effects of the present disclosure tend to be efficiently provided.

[Higher Ethylene Content EVOH (B)]

The higher ethylene content EVOH (B) to be used in the present disclosure is an EVOH prepared by saponifying a vinyl acetate component of an ethylene-vinyl acetate copolymer having an ethylene content of not less than 70 mol % and, therefore, has a significantly different ethylene content from the EVOH (A). The higher ethylene content EVOH (B) is poorer in gas barrier property than ordinary EVOH and, therefore, is generally regarded as a thermoplastic resin different from ordinary EVOH.

The higher ethylene content EVOH (B) to be used in the present disclosure is required to have an ethylene content of not less than 70 mol % as measured in conformity with ISO14663, and the upper limit of the ethylene content is typically 98 mol %. The ethylene content of the higher ethylene content EVOH (B) is preferably 75 to 95 mol %, more preferably 80 to 95 mol %. If the ethylene content is excessively low, the EVOH property-improving effect (for improving the thrust strength and the tensile elongation of the EVOH (A)) tends to be reduced.

The higher ethylene content EVOH (B) typically has a saponification degree of not lower than 20 mol %, preferably 40 to 100 mol %, particularly preferably 80 to 100 mol %, as measured in conformity with JIS K6726. If the saponification degree is excessively low, the higher ethylene content EVOH (B) tends to have insufficient affinity for the EVOH (A) and poorer dispersibility. Therefore, the film appearance tends to be deteriorated, and the thrust strength-improving effect and the tensile elongation-improving effect tend to be reduced.

The higher ethylene content EVOH (B) typically has a melt flow rate (MFR) of 0.5 to 100 g/10 minutes, preferably 1 to 50 g/10 minutes, more preferably 2 to 30 g/10 minutes (as measured at 190° C. with a load of 2160 g). In this case, the higher ethylene content EVOH (B) is excellent in dispersibility to provide excellent effects of the present disclosure.

The higher ethylene content EVOH (B) typically has a density of 500 to 1,500 kg/m$^3$, preferably 800 to 1,200 kg/m$^3$, particularly preferably 900 to 1,100 kg/m$^3$.

The higher ethylene content EVOH (B) is prepared by polymerizing ethylene and vinyl acetate by a known polymerization method such as solution polymerization method, suspension polymerization method or emulsion polymerization method, and saponifying the resulting copolymer by a known saponification method. The higher ethylene content EVOH (B) may contain a structural unit derived from any of the comonomers described above for the EVOH (A) in an amount that does not impair the effects of the present disclosure (e.g., in an amount of not greater than 20 mol % of the higher ethylene content EVOH (B)).

The higher ethylene content EVOH (B) may be a carboxyl-containing carboxyl-modified higher ethylene content EVOH obtained by chemically bonding an unsaturated carboxylic acid or its anhydride to a higher ethylene content EVOH by an addition reaction, a graft reaction or the like. Specifically, the carboxyl-containing carboxyl-modified higher ethylene content EVOH preferably has a modification degree of not higher than 10 mol %, for example.

Examples of the unsaturated carboxylic acid and its anhydride include: ethylenically unsaturated monocarboxylic acids such as acrylic acid, methacrylic acid, ethacrylic acid, and crotonic acid; and ethylenically unsaturated dicarboxylic acids, and their anhydrides and half esters such as fumaric acid, itaconic acid, citraconic acid, maleic acid, monomethyl maleate, monoethyl maleate, and maleic anhydride. Of these, maleic anhydride is preferably used.

A single higher ethylene content EVOH may be used as the higher ethylene content EVOH (B), or two or more higher ethylene content EVOHs having different ethylene contents, different saponification degrees, different molecular weights, different MFRs, different densities, different modifying groups, and/or different modification degrees may be used as the higher ethylene content EVOH (B).

In the resin composition of the present disclosure, the blend weight ratio of the EVOH (A) to the higher ethylene content EVOH (B) is typically (A)/(B)=1/99 to 99/1, preferably 50/50 to 99/1, preferably 60/40 to 99/1, more preferably 70/30 to 99/1, still more preferably 72/28 to 95/5, particularly preferably 75/25 to 90/10, especially preferably 75/25 to 85/15. Where the blend weight ratio of the EVOH (A) to the higher ethylene content EVOH (B) falls within the aforementioned ranges, the coloration-suppressing effect is further improved.

The total amount of the EVOH (A) and the higher ethylene content EVOH (B) contained in the resin composition of the present disclosure is typically not less than 70 wt. %, preferably not less than 80 wt. %, more preferably not less than 90 wt. %. The upper limit of the total amount of the EVOH (A) and the higher ethylene content EVOH (B) corresponds to a weight obtained by subtracting the weight of the sorbic acid ester (C) from the weight of the resin composition.

[Sorbic Acid Ester (C)]

In the present disclosure, the resin composition containing the EVOH (A) and the higher ethylene content EVOH (B) further contains the sorbic acid ester (C) in a specific very small amount, thereby providing a remarkable effect for suppressing the heat coloration.

In a resin composition prepared by mixing the ordinary EVOH and the higher ethylene content EVOH, the ordinary EVOH having a lower ethylene content is generally susceptible to thermal degradation. Therefore, it is supposed that the resin composition has portions susceptible to degradation and portions less susceptible to degradation.

In the present disclosure, a reason why the coloration of the resin composition is suppressed by the blending of the specific very small amount of the sorbic acid ester (C) is supposedly that the sorbic acid ester (C) has a lower polarity and, therefore, can be homogeneously dispersed in the resin composition even if being present in the very small amount in the resin composition. It is considered that the sorbic acid ester (C) is hydrolyzed to generate sorbic acid, which in turn captures radicals, whereby the excellent coloration-suppressing effect is provided. Further, it is supposed that a so-called catalytic cycle occurs in which an alcohol resulting from the hydrolysis of the sorbic acid ester (C) reacts with sorbic acid capturing the radicals, whereby the sorbic acid ester (C) is generated, and then the sorbic acid ester (C) thus generated is thermally hydrolyzed again.

It is supposed that sorbic acid capable of capturing the radicals thus constantly occurs and, therefore, the radicals can be captured in the resin composition at the early stage of the radical generation, making it possible to provide the excellent coloration-suppressing effect. It is also supposed that, in the present disclosure in which the resin composition contains the sorbic acid ester (C) in the specific very small amount, the aforementioned cycle can efficiently work to thereby provide the remarkable coloration-suppressing effect.

A sorbic acid ester prepared by condensation of sorbic acid and an alcohol or a phenol derivative, for example, is usable as the sorbic acid ester (C). Specific examples of the sorbic acid ester include alkyl sorbates such as methyl sorbate, ethyl sorbate, propyl sorbate, butyl sorbate, and pentyl sorbate, and aryl sorbates such as phenyl sorbate and naphthyl sorbate, which may be used alone or in combination.

Where the acidity of the alcohol resulting from the hydrolysis of the sorbic acid ester (C) is relatively low, the resin composition is less susceptible to deterioration. Therefore, the alkyl sorbates are preferred, and alkyl sorbates containing a C1 to C5 alkoxy group are more preferred. Alkyl sorbates containing a C1 to C3 alkoxy group are particularly preferred, and methyl sorbate and ethyl sorbate are most preferred.

The sorbic acid ester (C) typically has a molecular weight of 120 to 220, preferably 120 to 200, particularly preferably 120 to 160. Where the molecular weight of the sorbic acid ester (C) falls within the aforementioned ranges, the coloration-suppressing effect tends to be efficiently provided.

The amount of the sorbic acid ester (C) contained in the resin composition is 0.00001 to 10 ppm, preferably 0.00005 to 5 ppm, more preferably 0.0001 to 3 ppm, particularly preferably 0.0005 to 0.5 ppm, especially preferably 0.001 to 0.1 ppm, based on the weight of the resin composition. Where the amount of the sorbic acid ester (C) falls within the aforementioned ranges, the coloration-suppressing effect is improved. If the amount of the sorbic acid ester (C) is excessively great, the number of conjugated double bonds is excessively great, so that the coloration is liable to result.

The amount of the sorbic acid ester (C) contained in the resin composition is typically 0.0001 to 10 ppm, preferably 0.0003 to 5 ppm, more preferably 0.0005 to 3 ppm, particularly preferably 0.0008 to 1 ppm, especially preferably 0.001 to 0.5 ppm, based on the total weight of the EVOH (A) and the sorbic acid ester (C). Where the amount of the sorbic acid ester (C) falls within the aforementioned ranges, the coloration-suppressing effect is efficiently provided. If the amount of the sorbic acid ester (C) is excessively great, the number of conjugated double bonds is excessively great, so that the coloration is liable to result.

In the case of pellets and other products formed from the resin composition of the present disclosure, the amount of the sorbic acid ester (C) contained in the resin composition can be measured by the following method. A sample is first prepared by pulverizing the formed product (e.g., the pellets) by a given method (e.g., a freeze-pulverizing method), and dissolving the pulverized product in a C1 to C5 lower alcohol solvent. Then, the sample is analyzed by a liquid chromatography/mass spectrometry (LC/MS/MS) method, whereby the amount of the sorbic acid ester (C) is determined.

In the case of a formed product containing the resin composition and some other thermoplastic resin or the like (e.g., a multilayer structure), a layer of the resin composition to be analyzed is taken out of the multilayer structure by a given method, and the measurement is performed in the aforementioned manner.

[Carboxyl-Containing Ethylene-Vinyl Acetate Copolymer]

In the present disclosure, a carboxyl-containing ethylene-vinyl acetate copolymer (hereinafter referred to as "acid-modified EVA") is preferably used to compatibilize the EVOH (A) and the higher ethylene content EVOH (B) to homogeneously disperse the EVOH (A) and the higher ethylene content EVOH (B) in the resin composition.

The acid-modified EVA is obtained by chemically bonding an unsaturated carboxylic acid or its anhydride to an ethylene-vinyl acetate copolymer typically having an ethylene content of not less than 70 mol %. The acid-modified EVA, which is not subjected to the saponification and, hence, contains no hydroxyl group, is a completely different resin from the higher ethylene content EVOH (B). Further, the acid-modified EVA is a completely different resin from the EVOH (A), because it lacks the excellent gas barrier property.

The acid-modified EVA is obtained by chemically bonding the unsaturated carboxylic acid or its anhydride to the ethylene-vinyl acetate copolymer by an addition reaction, a graft reaction or the like. Examples of the unsaturated carboxylic acid and its anhydride include maleic acid, maleic anhydride, fumaric acid, acrylic acid, methacrylic acid, crotonic acid, itaconic acid, citraconic acid, and hexahydrophthalic anhydride. Of these, maleic anhydride is preferably used. Specifically, a mixture containing one or two or more selected from polyethylenes modified with maleic anhydride, polypropylenes modified with maleic anhydride, ethylene-propylene copolymers modified with maleic anhydride, ethylene-methyl acrylate copolymers modified with maleic anhydride, ethylene-ethyl acrylate copolymers modified with maleic anhydride, and ethylene-vinyl acetate copolymers modified with maleic anhydride is preferred.

The modification degree of the acid-modified EVA modified with the unsaturated carboxylic acid or its anhydride is preferably 0.001 to 3 wt. %, more preferably 0.01 to 1 wt. %, particularly preferably 0.03 to 0.5 wt. %. If the modification degree is excessively low, it tends to be impossible to sufficiently provide the effect of the acid-modified EVA for improving the compatibility between the EVOH (A) and the higher ethylene content EVOH (B). If the modification degree is excessively high, on the other hand, the resin composition tends to be poorer in heat stability.

The acid-modified EVA typically has a melt flow rate (MFR) of 0.5 to 100 g/10 minutes, preferably 1 to 50 g/10 minutes, more preferably 2 to 30 g/10 minutes, as measured at 190° C. with a load of 2160 g.

The acid-modified EVA typically has a density of 500 to 1,500 kg/m$^3$, preferably 800 to 1,200 kg/m$^3$, more preferably 900 to 1,000 kg/m$^3$.

In the present disclosure, a single acid-modified EVA may be used, or two or more acid-modified EVAs having different ethylene contents, different molecular weights, different MFRs, different densities, different modifying groups, and/or different modification degrees falling within the aforementioned ranges may be used in combination.

The amount of the acid-modified EVA contained in the resin composition of the present disclosure is 0.1 to 10 parts by weight, more preferably 0.5 to 8 parts by weight, particularly preferably 2 to 5 parts by weight, based on 100 parts by weight of the EVOH (A).

In the resin composition, the blend weight ratio of the higher ethylene content EVOH (B) to the acid-modified EVA is 1 to 400, preferably 2 to 100, more preferably 3 to 50, particularly preferably 4 to 20.

[Other Thermoplastic Resin]

The resin composition of the present disclosure may further contain a thermoplastic resin other than the EVOH (A), the higher ethylene content EVOH (B), and the acid-modified EVA as a resin component in an amount that does not impair the effects of the present disclosure (typically in an amount of not greater than 30 wt. %, preferably not greater than 10 wt. %, more preferably not greater than 5 wt. %, particularly preferably not greater than 3 wt. %, based on the weight of the resin composition).

Specific examples of the other thermoplastic resin include olefin homopolymers and copolymers such as linear low-density polyethylenes, low-density polyethylenes, medium-density polyethylenes, high-density polyethylenes, ethylene-vinyl acetate copolymers, ionomers, ethylene-propylene copolymers, ethylene-α-olefin (C4 to C20 α-olefin) copolymers, ethylene-acrylate copolymers, polypropylenes, propylene-α-olefin (C4 to C20 α-olefin) copolymers, polybutenes, and polypentenes, polycycloolefins, polyolefin resins in a broader sense such as modified polyolefin resins obtained by graft-modifying any of the aforementioned olefin homopolymers and copolymers with an unsaturated carboxylic acid or an unsaturated carboxylic acid ester, polystyrene resins, polyester resins, chlorinated vinyl resins such as polyvinyl chlorides and polyvinylidene chlorides, polyamide resins, acrylic resins, vinyl ester resins, polystyrene elastomers, polyester elastomers, polyurethane elastomers, chlorinated polyethylenes, and chlorinated polypropylenes. These thermoplastic resins may be used alone or in combination.

[Other Additives]

As required, the resin composition of the present disclosure may contain known additives in addition to the aforementioned components in amounts that do not impair the effects of the present disclosure (e.g., typically in amounts of not greater than 10 wt. %, preferably not greater than 5 wt. %, particularly preferably not greater than 3 wt. %, based on the overall weight of the resin composition). Examples of the additives include: plasticizer (e.g., aliphatic polyhydric alcohol such as ethylene glycol, glycerin, hexanediol, or the like); lubricant such as higher fatty acid (e.g., lauric acid, myristic acid, palmitic acid, stearic acid, behenic acid, oleic acid, or the like), higher fatty acid metal salt (e.g., calcium stearate, magnesium stearate, or the like), higher fatty acid ester (e.g., methyl ester, isopropyl ester, butyl ester, octyl ester, or the like of higher fatty acid), higher fatty acid amide (e.g., stearamide, oleamide, or the like), bis-higher fatty acid amide (e.g., ethylene bis-stearamide, or the like), or low-molecular weight polyolefin (e.g., low-molecular weight polyethylene or low-molecular weight polypropylene having a molecular weight of about 500 to about 10,000); drying agent; oxygen absorber; heat stabilizer; photo stabilizer; flame retardant; crosslinking agent; curing agent; foaming agent; crystal nucleating agent; antifogging agent; biodegradation agent; silane coupling agent; antiblocking agent; antioxidant; colorant; antistatic agent; UV absorber; antibacterial agent; insoluble inorganic double salt (e.g., hydrotalcites or the like); surfactant; and wax. These may be used alone or in combination.

Examples of the heat stabilizer to be used for improving the heat stability and other various physical properties during the melt forming include: organic acids such as acetic acid, propionic acid, and butyric acid, salts of the organic acids such as alkali metal salts (sodium salts, potassium salts, and the like), alkali earth metal salts (calcium salts, magnesium salts, and the like), and zinc salts of the organic acids; and inorganic acids such as sulfuric acid, sulfurous acid, carbonic acid, phosphoric acid, and boric acid, and alkali metal salts (sodium salts, potassium salts, and the like), alkali earth metal salts (calcium salts, magnesium salts, and the like), and zinc salts of the inorganic acids.

Of these, acetic acid, boron compounds such as boric acid and its salts, acetic acid salts, and phosphoric acid salts are preferably blended as the heat stabilizer.

The amount of acetic acid to be blended as the heat stabilizer is typically 0.001 to 1 part by weight, preferably 0.005 to 0.2 parts by weight, particularly preferably 0.01 to 0.1 part by weight, based on 100 parts by weight of the EVOH (A). If the amount of acetic acid is excessively small, the effect of blending acetic acid tends to be reduced. If the amount of acetic acid is excessively great, on the other hand, formation of a uniform film tends to be difficult.

The amount of a boron compound to be blended as the heat stabilizer is typically 0.001 to 1 part by weight on a boron basis based on 100 parts by weight of the EVOH (A) (as measured by ICP emission spectrometry after ashing). If the amount of the boron compound is excessively small, the effect of blending the boron compound tends to be reduced. If the amount of the boron compound is excessively great, on the other hand, formation of a uniform film tends to be difficult.

The amount of an acetic acid salt or a phosphoric acid salt (or a hydrogen phosphoric acid salt) to be blended as the heat stabilizer is typically 0.0005 to 0.1 part by weight on a metal basis based on 100 parts by weight of the EVOH (A) (as measured by ICP emission spectrometry after ashing). If the amount of the acetic acid salt or the phosphoric acid salt is excessively small, the effect of the blending tends to be reduced. If the amount of the acetic acid salt or the phosphoric acid salt is excessively great, on the other hand, formation of a uniform film tends to be difficult. Where two or more salts are blended in the resin composition, the total amount of the two or more salts preferably falls within the aforementioned ranges.

[Resin Composition Production Method]

The resin composition of the present disclosure is produced by using the EVOH (A), the higher ethylene content EVOH (B), and the sorbic acid ester (C) as the essential components and, as required, using the acid-modified EVA and any of the aforementioned optional additives. Known examples of a method for the production include dry blending method, melt mixing method, solution mixing method, and impregnation method, which may be used in combination.

An example of the dry blending method is a method (I) including the step of dry-blending the sorbic acid ester (C) with pellets containing at least one selected from the group consisting of the EVOH (A) and the higher ethylene content EVOH (B) by means of a tumbler or the like.

Examples of the melt mixing method include: a method (II) including the steps of melt-kneading a dry blend of the sorbic acid ester (C) and pellets containing at least one selected from the group consisting of the EVOH (A) and the higher ethylene content EVOH (B), and forming the resulting melt mixture into pellets or other product; and a method (III) including the steps of adding the sorbic acid ester (C) to at least one selected from the group consisting of the EVOH (A) and the higher ethylene content EVOH (B) in a melted state, melt-kneading the resulting mixture, and forming the resulting melt mixture into pellets or other product.

Examples of the solution mixing method include: a method (IV) including the steps of preparing a solution by using commercially available pellets containing at least one selected from the group consisting of the EVOH (A) and the higher ethylene content EVOH (B), blending the sorbic acid ester (C) with the solution, solidifying and forming the resulting solution into pellets, separating the pellets from the solution, and drying the pellets; and a method (V) including the steps of adding at least one selected from the group consisting of the sorbic acid ester (C) and a solution of the higher ethylene content EVOH (B) to a homogeneous solution (water/alcohol solution or the like) of the EVOH after the saponification in the preparation of the EVOH (A), solidifying and forming the resulting solution into pellets, separating the pellets from the solution, and drying the pellets.

An example of the impregnation method is a method (VI) including the steps of bringing pellets containing at least one selected from the group consisting of the EVOH (A) and the higher ethylene content EVOH (B) into contact with an aqueous solution containing the sorbic acid ester (C) to incorporate the sorbic acid ester (C) into the pellets, and then drying the resulting pellets.

In the methods described above, a composition (master batch) containing the sorbic acid ester (C) at a higher concentration may be prepared by blending the sorbic acid ester (C) in a predetermined proportion with at least one selected from the group consisting of the EVOH (A) and the higher ethylene content EVOH (B), and the resin composition may be produced as containing the sorbic acid ester (C) at a predetermined concentration by blending the master batch with the EVOH (A) or the higher ethylene content EVOH (B).

In the present disclosure, different methods may be selected from the aforementioned methods to be used in combination. Particularly, the melt mixing method is preferred, and the method (II) is particularly preferred, because the resin composition produced by these methods is significantly improved in productivity and the effects of the present disclosure.

Where the acid-modified EVA and any of the aforementioned additives are blended as optional components in the resin composition, the aforementioned production methods may be employed in substantially the same manner for blending the optional components in the resin composition.

Pellets of the resin composition to be produced by any of the aforementioned methods, and the pellets containing at least one selected from the group consisting of the EVOH (A) and the higher ethylene content EVOH (B) to be used in any of the aforementioned methods may each have any desired shape. The pellets may each have, for example, spherical shape, oval shape, cylindrical shape, cubic shape, square prism shape, or the like, and typically the oval shape or the cylindrical shape. For easy handling of the pellets in the subsequent use as a forming material, the cylindrical pellets typically each have a bottom diameter of 1 to 6 mm and a length of 1 to 6 mm, preferably a bottom diameter of 2 to 5 mm and a length of 2 to 5 mm. In the case of the oval pellets, the major diameter is typically 1.5 to 30 mm, preferably 3 to 20 mm, more preferably 3.5 to 10 mm, and the minor diameter is typically 1 to 10 mm, preferably 2 to 6 mm, particularly preferably 2.5 to 5.5 mm. In an exemplary method for determination of the major diameter and the minor diameter, a pellet is observed on a hand, and the major diameter of the pellet is measured by means of a measuring instrument such as a caliper. Then, a maximum sectional plane orthogonal to the major diameter is visually and tactually identified, and the minor diameter of the maximum sectional plane is measured in the aforementioned manner.

The resin composition of the present disclosure typically has a water content of 0.01 to 0.5 wt. %, preferably 0.05 to 0.35 wt. %, particularly preferably 0.1 to 0.3 wt. %.

In the present disclosure, the water content of the resin composition is measured and calculated by the following method.

The weight (W1) of a sample of the resin composition is measured at a room temperature (25° C.) by an electronic balance before drying, and the sample is dried at 150° C. for 5 hours in a hot air dryer. After drying, the sample is cooled in a desiccator for 30 minutes. After the temperature of the sample of the resin composition is returned to the room temperature (25° C.), the weight (W2) of the sample is measured. The water content of the resin composition is calculated from the following expression:

$$\text{Water content (wt. \%)}=[(W1-W2)/W1]\times 100$$

The resin composition of the present disclosure may be produced in any of various forms, e.g., in pellet form, powdery form, or liquid form, for use as a forming material for various formed products. Particularly, the resin composition of the present disclosure is preferably provided as a melt forming material, because the effects of the present disclosure tend to be more efficiently provided. The resin composition of the present disclosure may be a resin composition prepared by mixing the resin composition with a resin other than the EVOH (A) and the higher ethylene content EVOH (B).

The pellets of the resin composition of the present disclosure may be used as they are for the melt forming. In order to ensure stable feeding of the resin composition pellets in the melt forming, it is also preferred to apply a known lubricant to surfaces of the pellets. Any of the lubricants described above may be used. The amount of the lubricant present on the pellets is typically not greater than 5 wt. %, preferably not greater than 1 wt. %, based on the weight of the resin composition.

Exemplary products to be formed from the resin composition of the present disclosure for practical applications include a single-layer film formed by using the resin composition of the present disclosure, and a multilayer structure including a layer formed by using the resin composition of the present disclosure.

[Multilayer Structure]

A multilayer structure of the present disclosure includes a layer formed from the resin composition of the present disclosure. The layer formed from the resin composition of the present disclosure (hereinafter referred to as "resin composition layer") may be laminated with some other base material (hereinafter referred to as "base resin") containing a thermoplastic resin other than the resin composition of the present disclosure as a major component. Thus, the resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polycycloolefin resins are preferred as hydrophobic resins.

Where layers a (a1, a2, . . . ) formed from the resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layer is provided between the resin composition layer and the base resin layer in the multilayer structure, the adhesive resin layer is located in contact with the resin composition layer and, therefore, a highly hydrophobic adhesive resin is preferably used for the adhesive resin layer.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., typically in amounts of not greater than 30 wt. %, preferably not greater than 10 wt. %, based on the weight of the base resin or the adhesive resin). These may be used alone or in combination.

The resin composition layer formed from the resin composition of the present disclosure and the base resin layer may be laminated together (optionally with the adhesive resin layer provided therebetween) by a known laminating method. Examples of the laminating method include: a method in which a film or a sheet of the resin composition of the present disclosure is laminated with the base resin by melt extrusion; a method in which the base resin layer is laminated with the resin composition of the present disclosure by melt extrusion; a method in which the resin composition and the base resin are coextruded; a method in which the resin composition layer and the base resin layer are dry-laminated together with the use of a known adhesive agent such as of organic titanium compound, isocyanate compound, polyester compound or polyurethane compound; and a method in which a solution of the resin composition is applied on the base resin layer, and a solvent is removed from the applied solution. Of these methods, the coextrusion method is preferred from the viewpoint of costs and environmental concerns.

The multilayer structure described above is further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat setting process to ensure dimensional stability after the stretching. The heat setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the resin composition of the present disclosure is used as a shrinkable film, the stretched film may be cold-set so as to be imparted with a heat-shrinkable property, for example, by applying cold air over the stretched film without performing the above heat setting process.

Further, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the resin composition layer and the base resin layer of the multilayer structure (resin composition layer/base resin layer) (if these layers each include a plurality of layers, the thickness ratio between the thickest one of the resin composition layers and the thickest one of the base resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging materials and packaging containers for general foods, condiments such as mayonnaise and dressing, fermented foods such as miso, fat and oil such as salad oil, beverages, cosmetics, pharmaceutical products, and the like. Further, the resin composition of the present disclosure and the multilayer structure including the layer formed from the resin composition of the present disclosure are highly tough and less susceptible to the coloration and, therefore, are very useful for agricultural film materials or agricultural films.

EXAMPLES

Embodiments of the present disclosure will hereinafter be described more specifically by way of examples thereof. However, it should be understood that the present disclosure be not limited to the examples within the scope of the present disclosure.

In the following examples, "parts" and "%" are based on weight, unless otherwise specified.

Prior to implementation of Examples, pellets of the following EVOH (A) and higher ethylene content EVOH (B) were prepared.

EVOH (A): Ethylene-vinyl alcohol copolymer having an ethylene structural unit content of 29 mol %, a saponification degree of 100 mol %, and an MFR of 3.2 g/10 minutes (as measured at 210° C. with a load of 2160 g)

Higher ethylene content EVOH (B): Saponified ethylene-vinyl acetate copolymer (MELTHENE H0051K available from Tosoh Corporation) having an ethylene structural unit content of 89 mol %, a saponification degree of 99 mol %, and an MFR of 6.5 g/10 minutes (as measured at 190° C. with a load of 2160 g)

Example 1

First, 80 parts of the pellets of the EVOH (A) and 20 parts of the pellets of the higher ethylene content EVOH (B) were dry-blended. Then, 100 parts of the dry-blended pellets and 0.0000004 parts (corresponding to 0.004 ppm based on the weight of resin composition) of methyl sorbate (available from FUJIFILM Wako Pure Chemical Corporation, and having a molecular weight of 126) as the sorbic acid ester (C) were pre-heated at 230° C. for 5 minutes and then melt-kneaded at 230° C. for 5 minutes by operating a plastograph (available from Brabender Corporation) at 50 rpm. Then, the resulting melt mixture was cooled and solidified, whereby a resin composition was prepared in an aggregated form. The resin composition thus prepared was pulverized by operating a crusher (SKR16-240 available from Sometani Sangyo Co., Ltd.) with its rotary blade rotated at a rotation speed of 650 rpm. The pulverized product of the resin composition was in a granular form having a size of 1- to 5-mm square. The resin composition had a water content of 0.20%.

Example 2

A resin composition and a pulverized product of the resin composition of Example 2 were produced in substantially the same manner as in Example 1, except that the amount of methyl sorbate was 0.00008 parts (corresponding to 0.8 ppm based on the weight of the resin composition). The resin composition had a water content of 0.21%.

Example 3

A resin composition and a pulverized product of the resin composition of Example 3 were produced in substantially the same manner as in Example 1, except that ethyl sorbate (available from FUJIFILM Wako Pure Chemical Corporation, and having a molecular weight of 140) was used instead of methyl sorbate. The resin composition had a water content of 0.15%.

Comparative Example 1

A resin composition and a pulverized product of the resin composition of Comparative Example 1 were produced in substantially the same manner as in Example 1, except that methyl sorbate was not blended. The resin composition had a water content of 0.16%.

Comparative Example 2

A resin composition and a pulverized product of the resin composition of Comparative Example 2 were produced in substantially the same manner as in Example 1, except that the amount of methyl sorbate was 0.0012 parts (corresponding to 12 ppm based on the weight of the resin composition). The resin composition had a water content of 0.20%.

Comparative Example 3

A pulverized product of Comparative Example 3 was produced by the melt-kneading and the pulverization in substantially the same manner as in Example 1, except that the higher ethylene content EVOH (B) and the sorbic acid ester (C) were not blended but the EVOH (A) was used alone. The EVOH (A) had a water content of 0.11%.

The resin compositions of Examples 1 to 3, and Comparative Examples 1 to 3 were each evaluated for the coloration by the following method. The results are shown below in Table 1.

[Coloration Evaluation]

The pulverized products of Examples 1 to 3, and Comparative Examples 1 to 3 were each evaluated based on the area ratio ("3803"/"4076") of a colored area having Color No. 3803 (R232, G216, B184) to a colored area having Color No. 4076 (R248, G232, B200) measured by means of a visual analyzer IRIS VA400 (available from Alpha mos K.K.) Color No. 3803 means a deep yellowish color, and Color No. 4076 means a light yellowish color. A higher value of the colored area ratio means that the resin composition was yellowed.

Example 2 in which the sorbic acid ester (C) was contained in an amount greater than the range specified by the present disclosure had a slightly improved coloration evaluation result over the resin composition of Comparative Example 1. In contrast, the resin compositions of Examples 1 to 3 each containing a specific very small amount of the sorbic acid ester (C) each had a significantly improved coloration evaluation result over the resin composition of Comparative Example 1 not containing the sorbic acid ester (C) and the resin composition of Comparative Example 2 containing a greater amount of the sorbic acid ester (C), and were further improved in coloration-suppressing effect compared with the resin of Comparative Example 3 containing the EVOH (A) alone.

The remarkable effects of the present disclosure can be understood from these results.

Multilayer structures produced by using the resin compositions of Examples produced in the aforementioned manner, and agricultural films produced by using the multilayer structures are less susceptible to the heat coloration.

While specific forms of the embodiments of the present disclosure have been shown in the aforementioned examples, the examples are merely illustrative but not limitative. It is contemplated that various modifications apparent to those skilled in the art could be made within the scope of the disclosure.

The resin composition of the present disclosure is highly tough and less susceptible to the coloration. Therefore, the resin composition of the present disclosure, and the multilayer structure including the layer formed from the resin composition of the present disclosure are useful for packaging materials and packaging containers for various foods, condiments such as mayonnaise and dressing, fermented foods such as miso, fat and oil such as salad oil, beverages, cosmetics, and pharmaceutical products. Further, the multilayer structure is very useful for an agricultural film material and an agricultural film.

The invention claimed is:

1. A resin composition comprising:
   (A) an ethylene-vinyl alcohol copolymer having an ethylene structural unit content of 20 to 60 mol %;
   (B) a saponified ethylene-vinyl acetate copolymer having an ethylene structural unit content of not less than 70 mol %; and
   (C) a sorbic acid ester;

TABLE 1

|  | Example 1 | Example 2 | Example 3 | Comparative Example 1 | Comparative Example 2 | Comparative Example 3 |
|---|---|---|---|---|---|---|
| EVOH (A) (parts) | 80 | 80 | 80 | 80 | 80 | 100 |
| Higher ethylene content EVOH (B) (parts) | 20 | 20 | 20 | 20 | 20 | — |
| Sorbic acid ester (C) | | | | | | |
| Type | Methyl sorbate | Methyl sorbate | Ethyl sorbate | — | Methyl sorbate | — |
| Amount (ppm) | 0.004 | 0.8 | 0.004 | — | 12 | — |
| Coloration evaluation | 0.3 | 0.4 | 0.3 | 1.8 | 0.8 | 0.5 |

As shown in Table 1, the resin composition of Comparative Example 1 containing the higher ethylene content EVOH (B) had a higher coloration evaluation value than the resin of Comparative Example 3 containing the EVOH (A) alone. This means that the resin composition of Comparative Example 1 is more liable to be thermally colored during melt kneading because it contains the higher ethylene content EVOH (B). Further, the resin composition of Comparative wherein the sorbic acid ester (C) is at least one selected from the group consisting of methyl sorbate and ethyl sorbate; and wherein the sorbic acid ester (C) is present in an amount of 0.00001 to 10 ppm based on weight of the resin composition.

2. The resin composition according to claim 1, wherein the ethylene-vinyl alcohol copolymer (A) and the saponified ethylene-vinyl acetate copolymer (B) are present in a weight ratio (A)/(B) of 1/99 to 99/1.

3. A melt-forming material comprising the resin composition according to claim 1.

4. A multilayer structure comprising a layer that comprises the resin composition according to claim 1.

5. An agricultural film comprising the multilayer structure according to claim 4.

* * * * *